US006128071A

United States Patent [19]
Melen

[11] Patent Number: 6,128,071
[45] Date of Patent: Oct. 3, 2000

[54] RANGE DATA RECORDATION

[75] Inventor: Roger D. Melen, Los Altos Hills, Calif.

[73] Assignee: Canon Kabushiki Kaisha, Tokyo, Japan

[21] Appl. No.: 09/090,797

[22] Filed: Jun. 4, 1998

[51] Int. Cl.[7] .............................. G01C 3/08; G01B 11/24; B02B 27/64
[52] U.S. Cl. ................. 356/4.05; 250/201.3; 250/201.7; 356/375; 356/376
[58] Field of Search ..................................... 702/155, 158, 702/166, 167; 356/375, 376, 4.05; 250/201.3, 201.7

[56] References Cited

U.S. PATENT DOCUMENTS

| | | | |
|---|---|---|---|
| 3,623,811 | 11/1971 | Lederer et al. | 356/4 |
| 3,682,071 | 8/1972 | Hosoe | 95/44 C |
| 3,769,889 | 11/1973 | Wechsler | 95/18 P |
| 3,875,401 | 4/1975 | Stauffer | 250/201 |
| 3,896,304 | 7/1975 | Aoki et al. | 250/201 |
| 3,953,863 | 4/1976 | Lang | 354/25 |
| 5,018,854 | 5/1991 | Rioux | 356/376 |
| 5,448,322 | 9/1995 | Bacs, Jr. | 354/112 |
| 5,495,576 | 2/1996 | Ritchey | 395/125 |
| 5,696,577 | 12/1997 | Stettner et al. | 356/4.01 |
| 5,784,164 | 7/1998 | Deck et al. | 356/359 |

OTHER PUBLICATIONS

What is Confocal Microscopy? http://gonzo.sci.man.ac.uk/Confocal/whatis/whatis.html, pp. 1–3, Mar. 24, 1998, United Kingdom.

Huxley, I., "3D View v1.01", A Quick and Easy Way to Visualize Confocal Reflection Datasets on the Mac, Department of Physical Optics, University of Sydney, pp. 1–3, http://www.physics.usyd.edu.au/physopt/3dview/, Jun. 1997, Sydney, Australia.

*Primary Examiner*—Stephen C. Buczinski
*Attorney, Agent, or Firm*—Fenwick & West LLP

[57] ABSTRACT

Detailed depth information in a three dimensional scene is recorded by a camera with a single lens system (100). In one embodiment, a lens (100) is movably attached to a camera housing (302) such that a motor (304) can move the lens (100) in the direction of the central axis of the lens (100). A two dimensional array (300) of photo-sensors is mounted in the camera along the central axis of the lens (100). As the lens system (100) is traversed along the central axis, objects at various distances (106) in front of the lens system (100) pass in and out of focus on the array (300) of photo-sensors. For a lens system (100) with a known focal length, the distance (108) between the lens system (100) and the array (300) when an object (102) comes into focus on the array (300) indicates the distance (106) between the lens system (100) and the object (102). The distance (106) from the lens system (100) to a plurality of points in a scene is calculated by determining the distance (108) between the lens system (100) and the array (300) when each of the points comes into focus on the array (300). Information related to the distance (106) from the lens system (100) to the plurality of points is recorded.

26 Claims, 5 Drawing Sheets

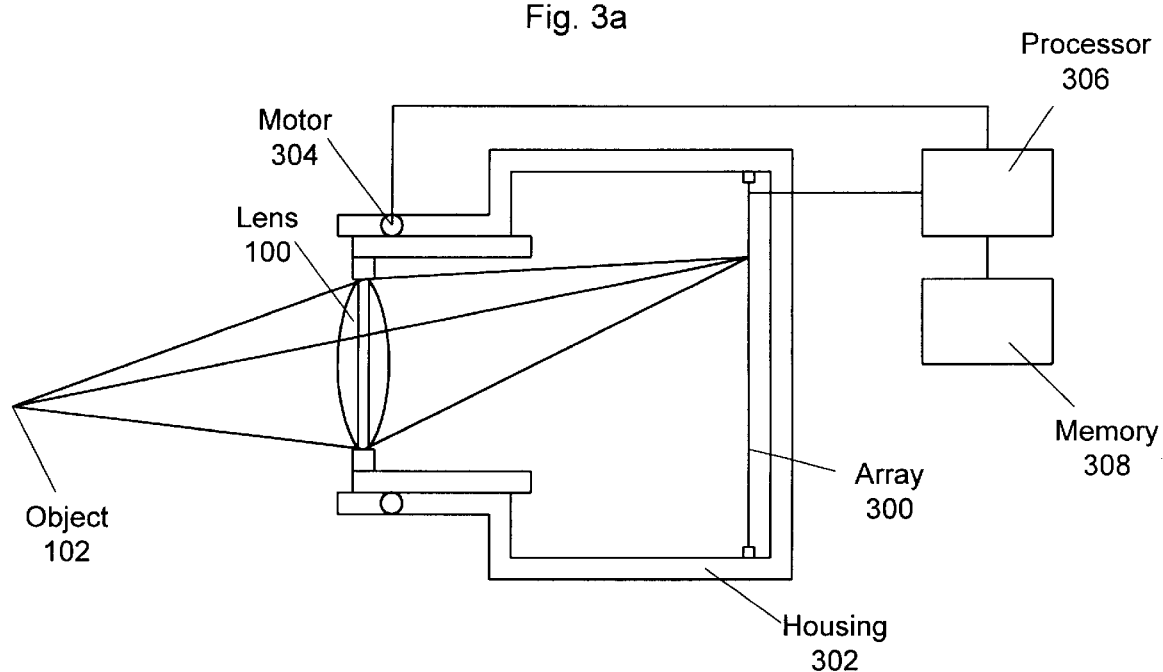
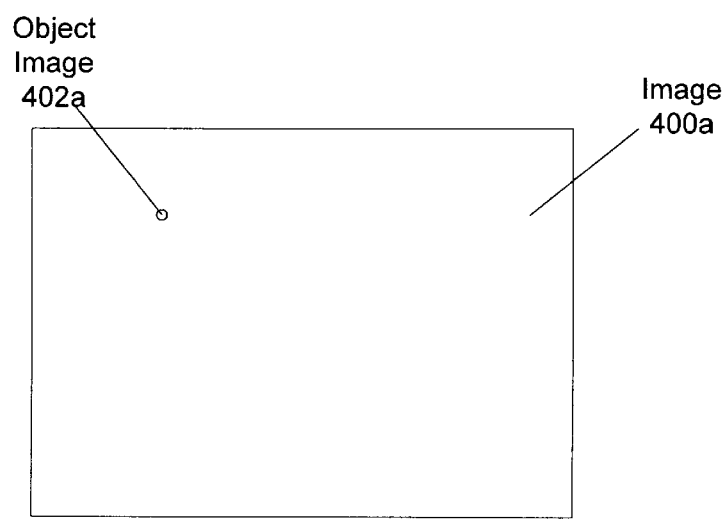

RANGE DATA RECORDATION

FIELD OF INVENTION

This invention pertains to the field of range finding. More specifically, this invention pertains to automatically finding the distance to various points represented in an image.

BACKGROUND OF THE INVENTION

Humans perceive depth principally through the effect of parallax, which requires binocular vision. Most conventional techniques for photographically capturing depth information from many points in a three dimensional scene involve stereoscopic recording equipment. A stereoscopic recording apparatus generally utilizes two cameras which are offset in a direction perpendicular to the direction of view. The resultant images can be viewed by a person with two functional eyes to extract depth information from the images. Automated means are used in the cartographic field for extracting depth information from stereoscopic images.

A stereoscopic recording apparatus requires that the two cameras be aligned to a high degree. This requirement makes the cost of constructing and maintaining a stereoscopic apparatus high. Further, the automated methods available for retrieving depth information from stereoscopic images suffer from high computational cost and generally low accuracy. Because some points in one stereoscopic image are often hidden in the other stereoscopic image, some error is probably inevitable in the automatic retrieval of depth information from stereoscopic images.

A typical non-stereoscopic technique for recording depth information over a three dimensional scene is confocal microscopy. In confocal microscopy a single photodetector is situated behind a pinhole in an opaque screen. An objective lens focuses light from an illuminated point onto the pinhole, and the screen masks out any non-focused light. The illuminated point is generally illuminated by an intense, focused light source, such as a laser. The illuminating light source and the pinhole must be scanned over a microscopic specimen, either one point at a time or in a series of lines. Depth information can then be extracted from the data recorded from the photodetector. Such a system is too complex and expensive for typical microscopy, and is not useful for macroscopic range detection.

What is needed is a system for determining depth information in a given three dimensional scene from information entering a single lens system. The system should allow for the recordation of depth information of either microscopic or macroscopic scenes, and should not require the use of a scanning light source.

SUMMARY OF THE INVENTION

A system and method record detailed depth information in a three dimensional scene with a single lens system. In one embodiment of the present invention, a lens system (100) is movably attached to a camera housing (302) such that a motor (304) can move the lens system (100) in the direction of the central axis of the lens system (100). A two dimensional array (300) of photo-sensors is mounted in the camera housing (302) along the central axis of the lens system (100). As the lens system (100) is traversed along the central axis, points at various distances in front of the lens system (100) pass in and out of focus on the array (300) of photo-sensors. For a lens system (100) with a known focal length, the distance (108) between the lens system (100) and the array (300) when a point comes into focus on the array (300) is sufficient to indicate the distance (106) between the lens system (100) and the object (102) which is represented by the point. In one embodiment, the distance (106) from the lens system (100) to a plurality of points in a scene is calculated by determining the distance (108) between the lens system (100) and the array (300) at the time each of the points comes into focus on the array (300). Information related to the distance (106) from the lens system (100) to the plurality of points is then recorded.

BRIEF DESCRIPTION OF THE DRAWINGS

FIGS. 3a and 3b illustrate an embodiment of the present invention.

FIGS. 4a and 4b illustrate images 400 which correspond to the devices shown in FIGS. 3a and 3b.

DETAILED DESCRIPTION OF THE PREFERRED EMBODIMENTS

Figure 1:
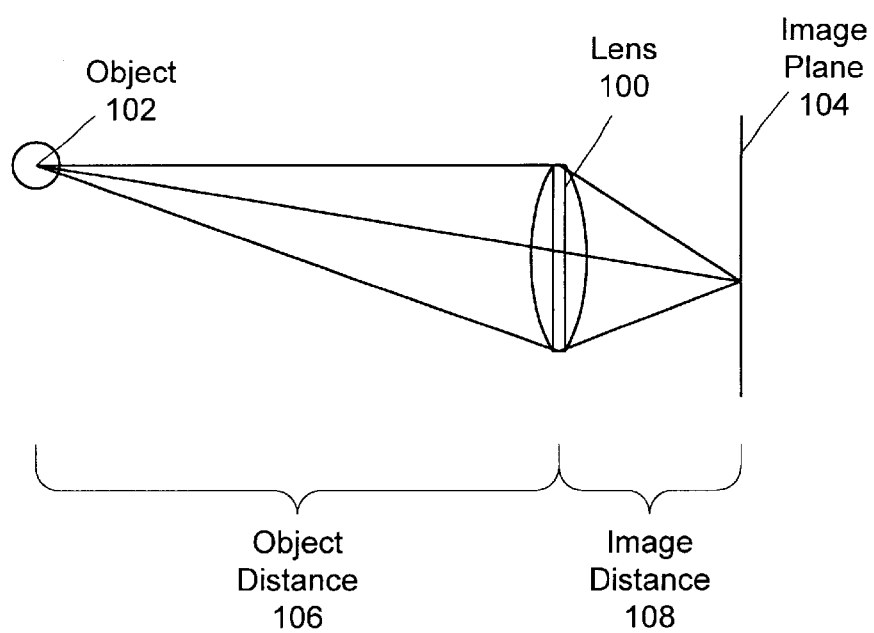
FIG. 1 is an illustration of a lens system 100 focusing light from an object 102 onto an image plane 104.

Referring now to FIG. 1, converging lens system 100 is shown focusing light from object 102 onto image plane 104. Object 102 is located a distance 106 in front of converging lens system 100. This distance 106 is referred to as object distance 106, or $d_o$. Light from object 102 is focused on image plane 104, which is a distance 108 behind lens system 100. This distance, which is dependent upon the characteristics of lens system 100 and object distance 106, is referred to as image distance 108, or $d_i$. Light from an object 102 an infinite distance in front of lens system 100 will be focused on image plane 104 when it is a distance behind lens system 100 which corresponds to the focal length of lens 100. Focal length is represented by the variable f, and is a fixed property of lens system 100. The mathematical relationship between $d_o$, $d_i$ and f is expressed in Equation 1.

$$\frac{1}{d_i} + \frac{1}{d_o} = \frac{1}{f} \qquad \text{Eq. 1}$$

Figure 2:
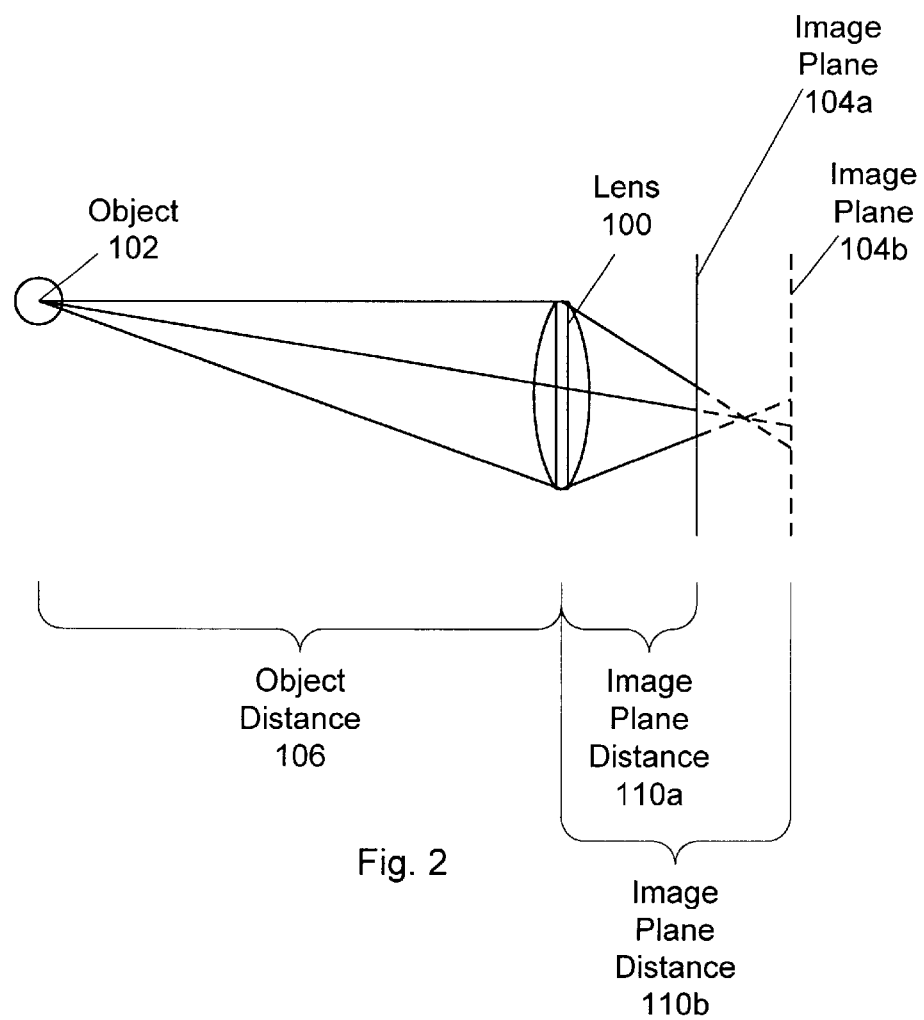
FIG. 2 is an illustration of two examples of an object 102 which is out of focus on the image plane 104.

As illustrated in FIG. 2, for an object 102 at a particular object distance 106, if image plane 104 is closer to or further from lens system 100 than image distance 108, light from object 102 will not be focused on image plane 104. Image plane 104a is closer than image distance 108 to lens system 100, and image plane 104b is further from lens system 100 than image distance 108. The light from object 102 in both cases is spread out over an area on image plane 104 which is larger than in the case where the distance between image plane 104 and lens system 100 is image distance 108. Due to this lack of focus, the image of object 102 on image planes 104a and 104b has less sharpness, and therefore less contrast, than the image of object 102 which is focused on image plane 104 in FIG. 1. The actual distance between lens system 100 and image plane 104 is image plane distance 110.

Contrast in an image of object 102 will be higher, in general, if object 102 is focused, because light coming from a point on object 102 is spread over a larger area in less focused images. If the contrast at a single region on image plane 104 is monitored as image plane distance 110 is varied, the measured contrast will reach a maximum when image plane distance 110 equals image distance 108. With Equation 1, and information about the focal length of lens system 100, the distance from lens system 100 to object 102 can be determined from knowledge of what image plane distance 110 results in the highest contrast in that portion of the image which corresponds to object 102.

Figure 3B:
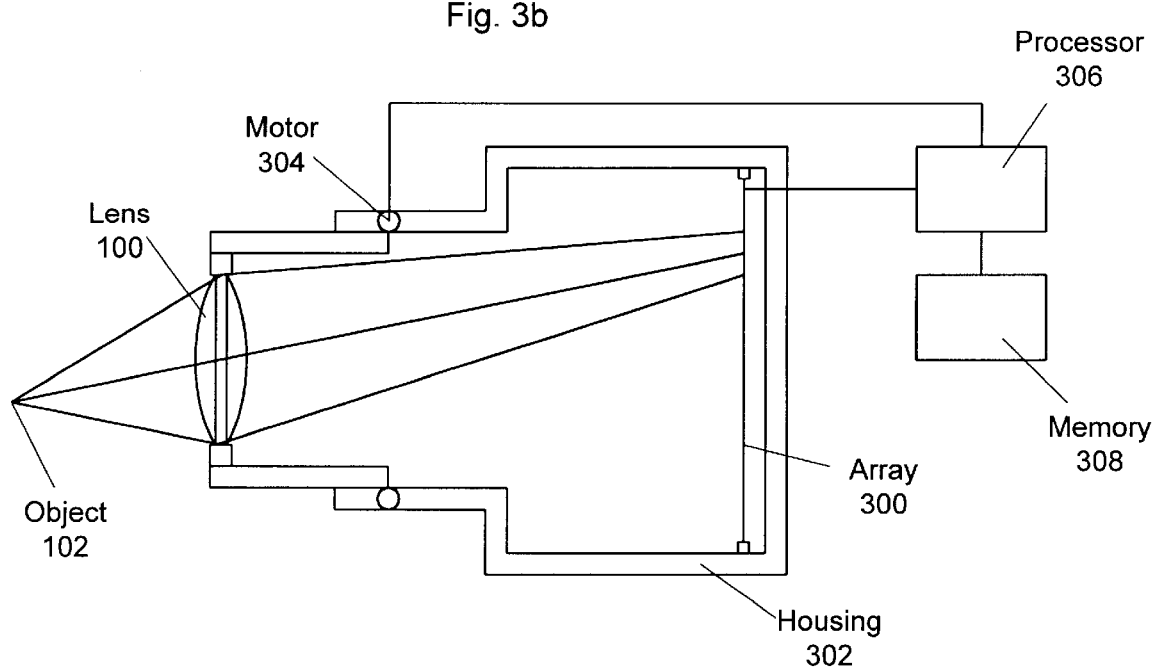

In a preferred embodiment of the present invention illustrated in FIGS. 3a and 3b, a two dimensional array 300 of photo-sensitive cells is mounted in camera housing 302. In one embodiment, array 300 is composed of Charge-Coupled Device (CCD) cells, such as the 1152 by 1728 pixel CCD incorporated in the Canon EOS D2000 digital camera. Lens system 100 is mounted in housing 302 such that motor 304 can move lens system 100 along its central axis. Motor 304 is preferably an ultrasonic motor, such as the UA80 ultrasonic motor produced by Canon Inc. Array 300 is mounted perpendicular to the central axis of lens system 100, in order to receive light that has passed through lens system 100.

Array 300 senses the intensity and color of light striking each of its cells and transmits this information to processor 306. The information transmitted from array 300 to processor 306 indicates to processor 306 the pattern of light striking each cell of array 300 at a sample point in time. This pattern forms an image 400 associated with each sample time. Processor 306 is coupled to memory 308, which can store several images 400 from array 300.

Figure 4B:
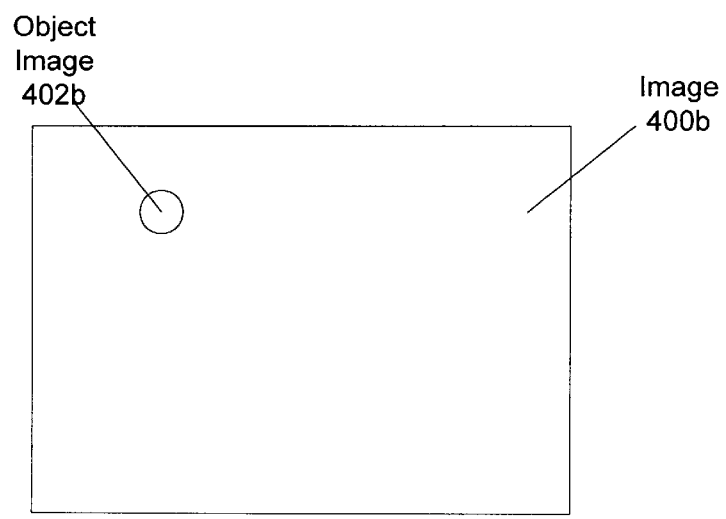

Processor 306 is also coupled to motor 304, and processor 306 can send signals to motor 304 which cause lens system 100 to traverse along its central axis, moving closer to, or farther away from array 300. As lens system 100 moves, image plane distance 110 changes, causing object distance 106 corresponding to objects 102 which are in focus on array 300 to change as well. Consequently, as lens system 100 moves, the distance from lens system 100 to focused objects 102 changes. In FIG. 3a, light from object 102 is focused on array 300, and forms image 400a in FIG. 4a. Object 102 appears as object image 402a in FIG. 4a. In FIG. 3b, lens system 100 is moved such that light from object 102 is not focused on array 300. FIG. 4b illustrates image 400b, which corresponds to array 300 of FIG. 3b. Object image 402b is noticeably larger than object image 402a in FIG. 4a, due to the lack of focus. Unfocused object image 402b will in general have lower contrast than focused object image 402a.

In operation, processor 306 commands motor 304 to sweep lens system 100 between two positions. Several times during the traversal, array 300 communicates an image 400 to processor 306, which stores that image 400 in memory 308.

Figure 5A:
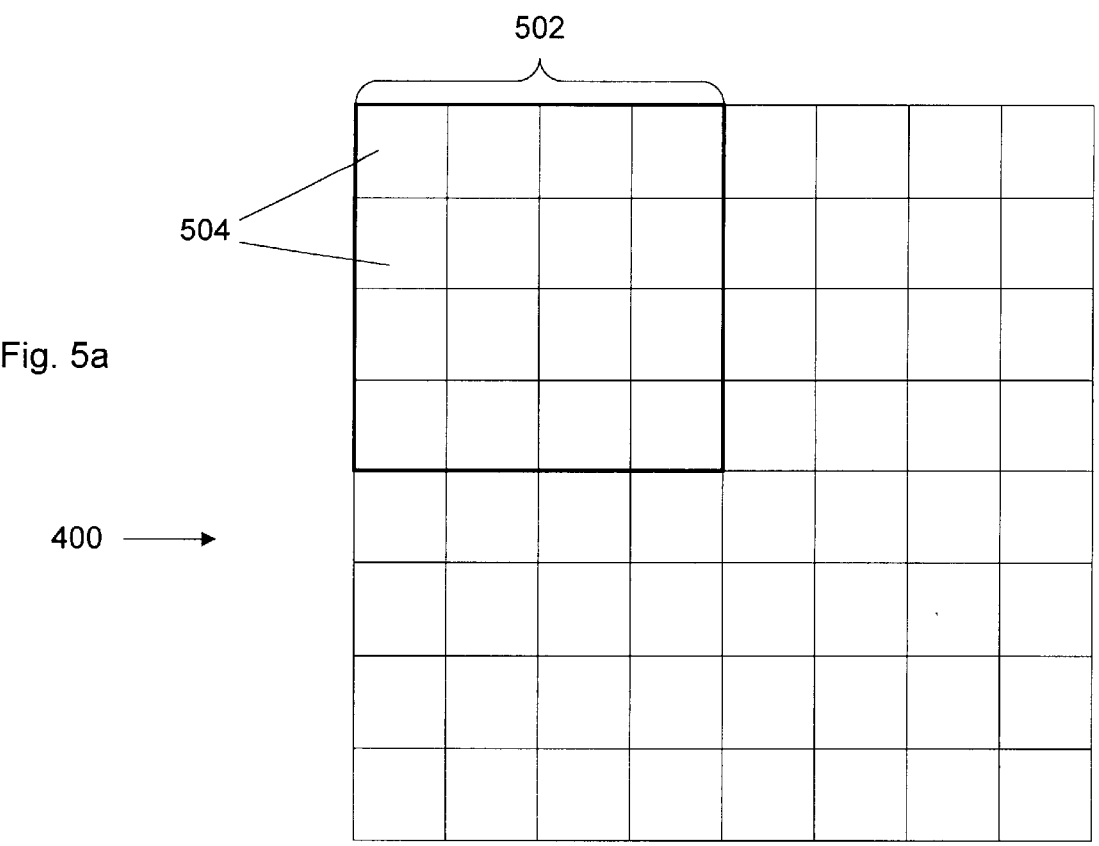
FIGS. 5a and 5b illustrate measurement regions 502 as subsets of pixels 504 of images 400.
Figure 5B:
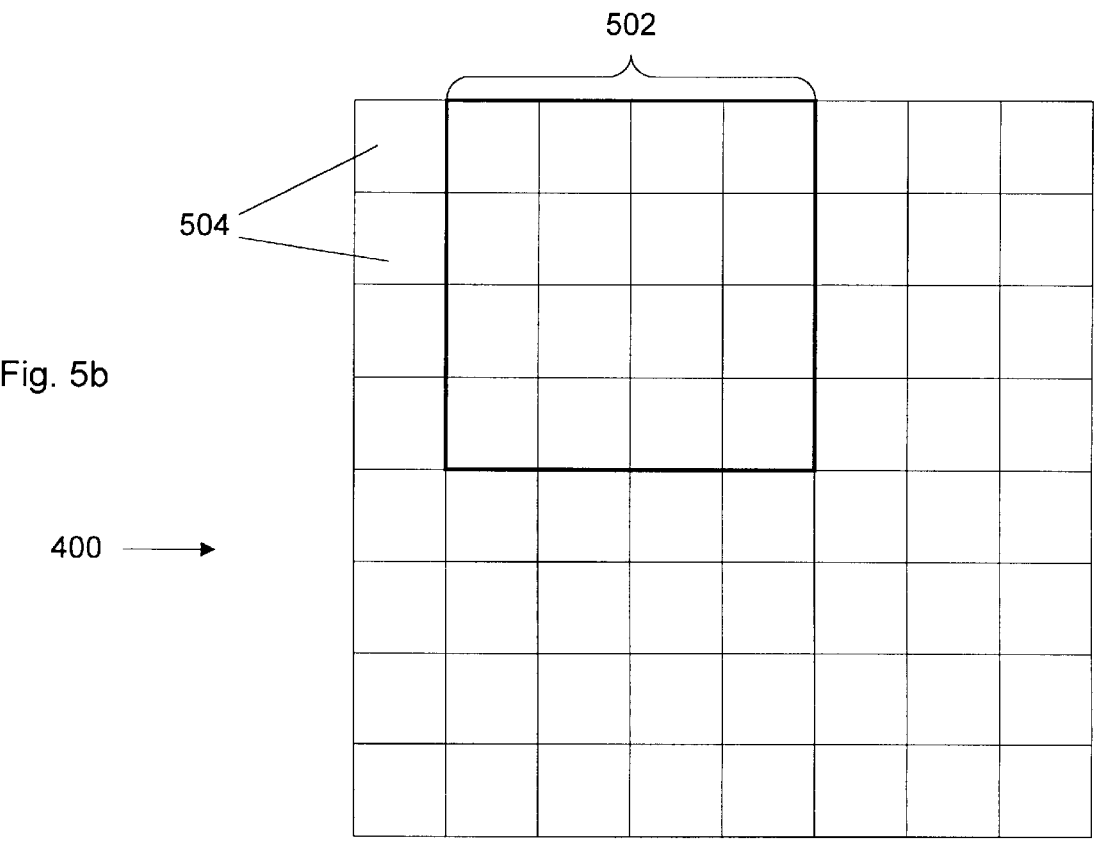

After the sweep, processor 306 examines the images 400 stored in memory 308. In alternate embodiments, another processor can perform this examination. As illustrated in FIGS. 5a and 5b, each image 400 is divided into a number of measurement regions 502, each encompassing one or more pixel locations 504. A conventional method is used to determine the contrast in each measurement regions 502. One example of such a method is to assign to each measurement region 502 a contrast value which is the ratio of the brightest pixel value in region 502 to the darkest pixel value in region 502. The calculated contrast is assigned to image 400 at a location corresponding to the centroid of measurement region 502.

After this is done for one measurement region 502, it is repeated for as many other measurement regions 502 as there are in image 400. A measurement region 502 may contain some of the same pixels as another measurement region 502. In FIG. 5b, measurement region 502 contains many of the same pixels as the measurement region 502 in FIG. 5a. The offset between measurement regions 502 in FIGS. 5a and 5b is just one pixel 504, indicating that contrast values are calculated at a resolution of one contrast value per pixel 504, even though the measurement regions 502 are much larger than one pixel 504. Different size measurement regions 502 can be used, as different images 400 have different contrast characteristics. For example, with an image 400 of many thin dark lines against a light background, the most accurate results will be obtained from small measurement regions 502. An image 400 of larger objects with less contrast will generally yield better results with larger measurement regions 502.

This calculation of contrast for each measurement region 502 is performed for each image 400 stored in memory 308. Then, for each measurement region 502, the image 400 with the maximum contrast for that measurement region 502 is determined. This image 400 is assumed to be the image 400 which was captured nearest the time when image plane distance 110 was equal to image distance 108. The image plane distance 110 associated with that image 400, together with the focal length of lens system 100 and Equation 1, gives the object distance 106 to the object 102 which is represented by the measurement region 502 of that image 400. Alternately, an image distance 108 corresponding to the maximum in contrast can be interpolated to a value between image distances 108 which correspond to images 400. Standard interpolation techniques can be used for this.

Figure 6:
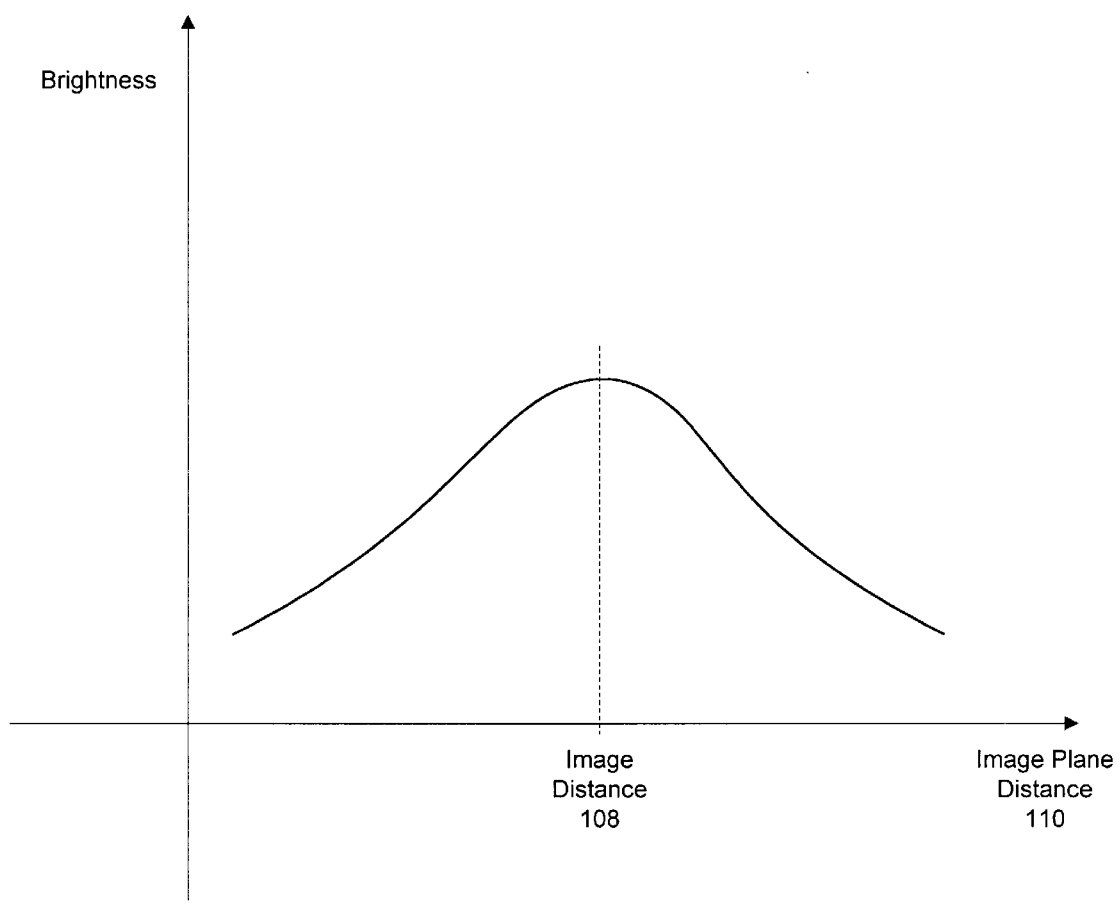
FIG. 6 illustrates a typical variation of image brightness which accompanies a change in image plane distance 110.

An alternate embodiment of the invention uses measurement regions 502 which each comprise only one pixel 504. Because one pixel does not contain enough information for a contrast calculation, the brightness of that pixel 504 in each image 400 is examined. In FIG. 6 a graph of such a brightness distribution is illustrated. At the point where image plane distance 110 equals image distance 108, there will be maximum contrast at the measurement region 502. This point of maximum contrast will generally coincide with a point of either maximum or minimum brightness. The image 400 in which a maximum or minimum brightness is observed for the pixel 504 corresponds approximately to the in-focus image plane distance 110, and therefore the object distance 106 to the object 102 being imaged. The resolution of the object distances 106 which can be determined depends on the difference in distance 108 between successive images 400. The smaller the change in distance 108 between successive images 400, the more accurate the range measurements will tend to be. Accuracy can also be affected by the depth of field of the system. When a smaller depth of field is used, the brightness curve illustrated in FIG. 6 will tend to be sharper. If the brightness curve is too sharp, and the change in distance 108 between successive images 400 is too large, the determination of the distance 108 which coincides with the peak may be inaccurate. As above, standard interpolation techniques can be used to determine image distance 108 on a finer resolution than would be available from images 400 alone.

The range information (object distance 106) for each measurement region 502 is recorded in the form of a range map which indicates the distance to points which are imaged in images 400. A composite image 400 can be constructed from images 400, the composite image 400 including from each image 400 those pixels which correspond to the centroids of in-focus measurement regions 502.

The range map and composite image 400 can be useful for a number of things. A three dimensional computer model of a scene measured by the system can be created, allowing a virtual reality "walk through" of the scene. A microscope system embodying the present invention can be used to create a photo-realistic three dimensional computer model of a specimen. The information from a macroscopic camera version of the present invention can be used by cartographers in the creation of visually accurate three dimensional maps.

The above description is included to illustrate the operation of an exemplary embodiment and is not meant to limit the scope of the invention. The scope of the invention is to be limited only by the following claims. From the above description, many variations will be apparent to one skilled in the art that would be encompassed by the spirit and scope of the present invention.

What is claimed is:

1. A system for determining range data relevant to a three-dimensional object, wherein the range data comprises a distance between a point on the object and the system, the system comprising:
    a lens having a known focal length;
    a sensor array mounted substantially perpendicular to a central axis of the lens, the sensor array being adapted for sensing radiation from the object, the radiation having passed from the object and through the lens to the sensor array, the sensor array producing radiation information from the radiation sensed;
    an adjusting means for changing a distance between the lens and the sensor array in response to a drive signal; and
    a processor module coupled to the sensor and to the adjusting means, the processor module for implementing a process comprising:
        sending a drive signal to the adjusting means to adjust the distance between the lens and the sensor array;
        receiving an image of the object, the image comprising radiation information produced by the sensor array;
        identifying a point of maximum focus in the image of the object, wherein the point of maximum focus corresponds to a point on the object;
        determining an image distance between the point of maximum focus and the lens; and
        calculating the distance between the corresponding point on the object and the lens of the system based on the focal length of the lens and the image distance.

2. The system of claim 1, wherein the lens comprises a lens system.

3. The system of claim 1, wherein the image of the object has a number of measurement regions; and the steps of identifying, determining, and calculating are performed for each of the measurement regions.

4. The system of claim 1, wherein the process implemented by the processor module further comprises:
    recording the distance between the corresponding point on the object and the lens of the system in a recording medium coupled to the processor module.

5. The system of claim 1, wherein the sensor array is a two dimensional array of photosensitive elements and the radiation is in the visible spectrum.

6. The system of claim 4, wherein the recording medium upon which the distance between the corresponding point on the object and the system is recorded is a digital medium.

7. The system of claim 6, wherein the digital medium is one of a magnetic disk medium, an optical disk medium, and a programmable solid state memory device.

8. The system of claim 1, wherein the processor module records the image of the object on the recording medium.

9. The system of claim 1, wherein the step of receiving the image of the object occurs while the distance between the lens and the sensor array is changing.

10. The system of claim 1, wherein the steps of sending, receiving, identifying, determining, and calculating are repeated at a plurality of distances between the lens and the sensor array.

11. The system of claim 1, wherein the step of identifying a point of maximum focus in the image of the object comprises calculating contrast information.

12. The system of claim 1, wherein the image of the object has a number of measurement regions, and the process implemented by the processor module further comprises:
    recording the distance between the corresponding point on the object and the lens of the system in a recording medium coupled to the processor module;
    wherein the steps of identifying, determining, calculating, and recording are performed for each of the measurement regions.

13. The system of claim 1, wherein the process implemented by the processor module further comprises:
    recording the distance between the corresponding point on the object and the lens of the system in a recording medium coupled to the processor module;
    wherein the steps of sending, receiving, identifying, determining, calculating, and recording are repeated at a plurality of distances between the lens and the sensor array.

14. A method for determining range information relevant to a three-dimensional scene, wherein the range information comprises a distance between a point in the three-dimensional scene and a system, wherein the system comprises a lens having a known focal length, and a sensor array mounted substantially perpendicular to a central axis of the lens, the sensor array adapted for sensing radiation that has passed from the three dimensional scene, through the lens and to the sensor array, and for producing radiation information, the method comprising:
    changing a distance between the lens and the sensor array;
    receiving an image of the three-dimensional scene, the image comprising radiation information produced by the sensor array;
    identifying a point of maximum focus in the image of the three-dimensional scene, wherein the point of maximum focus corresponds to a point in the three-dimensional scene;
    determining an image distance between the point of maximum focus and the lens; and
    calculating the distance between the corresponding point in the three-dimensional scene and the lens of the system based on the focal length of the lens and the image distance.

15. The method of claim 14, wherein the lens comprises a lens system.

16. The method of claim 14, wherein the image of the three-dimensional scene has a number of measurement regions; and the steps of identifying, determining, and calculating are performed for each of the measurement regions.

17. The method of claim 14, further comprising:
    recording the distance between the corresponding point in the three-dimensional scene and the lens of the system.

18. The method of claim 17, wherein the the image of the three-dimensional scene has a number of measurement regions; and the step of recording is performed for each of the measurement regions.

19. The method of claim 14, wherein the sensor array is a two dimensional array of photosensitive elements and the radiation is in the visible spectrum.

20. The method of claim 17, wherein the distance between the corresponding point in the three-dimensional scene and the system is recorded in a digital medium.

21. The method of claim 20, wherein the digital medium is one of a magnetic disk medium, an optical disk medium, and a programmable solid state memory device.

22. The method of claim 14, further comprising the step of:

recording the image of the three-dimensional scene.

23. The method of claim 14, wherein the step of receiving the image of the three-dimensional scene occurs while the distance between the lens and the sensor array is changing.

24. The method of claim 14, wherein the steps of changing, receiving, identifying, determining, and calculating are repeated at a plurality of distances between the lens and the sensor array.

25. The method of claim 14, wherein the step of identifying a point of maximum focus in the image of the three-dimensional scene comprises calculating contrast information.

26. The method of claim 14, further comprising:

recording the distance between the corresponding point in the three-dimensional scene and the lens of the system;

wherein the steps of changing, receiving, identifying, determining, calculating, and recording are repeated at a plurality of distances between the lens and the sensor array.

* * * * *